United States Patent [19]

Meeker

[11] E Re. 30,725

[45] Reissued Sep. 1, 1981

[54] FIREPLACE GRATE

[76] Inventor: John G. Meeker, Deansbridge Rd., Somers, N.Y. 10589

[21] Appl. No.: 124,665

[22] Filed: Feb. 26, 1980

Related U.S. Patent Documents

Reissue of:

[64] Patent No.: 4,076,012
Issued: Feb. 28, 1978
Appl. No.: 627,184
Filed: Oct. 30, 1975

[51] Int. Cl.[3] ..... F23H 13/00; F28F 3/14

[52] U.S. Cl. ..... 126/164; 126/121; 126/143; 165/170; 165/185

[58] Field of Search ..... 237/51; 126/120, 121, 126/152 R, 152 A, 152 B, 164, 165, 163 R, 163 A, 143; 165/166, 170, 185, DIG. 8

[56] References Cited

U.S. PATENT DOCUMENTS

| | | | |
|---|---|---|---|
| 2,165,661 | 7/1939 | Stenquist | 126/121 |
| 2,375,318 | 5/1945 | Mudgett | 126/121 |
| 2,497,486 | 2/1950 | Barber | 126/120 |
| 2,828,078 | 3/1958 | Snodgrass | 237/51 |
| 3,001,521 | 9/1961 | Reilly | 126/121 |
| 3,078,839 | 2/1963 | Mitchell et al. | 126/179 |
| 3,190,279 | 6/1965 | Davis | 126/121 |
| 3,240,206 | 3/1966 | Schutt | 126/121 |
| 3,339,540 | 9/1967 | Krieder | 126/121 |
| 3,361,195 | 1/1968 | Meyerhoff et al. | 165/170 |
| 3,387,653 | 6/1968 | Coe | 165/170 |
| 3,412,566 | 11/1968 | Townsend et al. | 165/185 |
| 3,452,737 | 7/1969 | Pellegrino et al. | 126/121 |
| 3,508,535 | 4/1970 | Martin et al. | 126/163 |
| 3,635,211 | 1/1972 | Englert | 126/121 |
| 3,705,717 | 12/1972 | Hadberg | 110/180 |
| 3,744,477 | 7/1973 | Andrews | 126/120 |
| 3,834,619 | 9/1974 | Glover | 126/121 |
| 3,901,212 | 8/1975 | Stites | 126/121 |
| 3,905,351 | 9/1975 | Hatfield et al. | 126/121 |
| 3,911,894 | 10/1975 | Richard et al. | 126/121 |
| 3,942,509 | 3/1976 | Sasser | 126/121 |
| 3,983,496 | 2/1976 | Kampf | 126/121 |
| 4,008,703 | 2/1977 | Allgood | 126/121 |
| 4,008,706 | 2/1977 | Buanno | 126/121 |
| 4,008,707 | 2/1977 | Bartlett | 126/121 |
| 4,010,729 | 3/1977 | Egli | 126/121 |
| 4,012,770 | 5/1977 | Pravda et al. | 165/185 |
| 4,018,208 | 4/1977 | Hamilton | 126/121 |
| 4,019,492 | 4/1977 | Rush | 126/121 |
| 4,026,263 | 5/1977 | Boyd | 126/121 |
| 4,050,441 | 9/1977 | Horwinski | 126/121 |
| 4,072,188 | 2/1978 | Wilson et al. | 165/185 |
| 4,102,319 | 7/1978 | Koopmeiners | 126/121 |
| 4,106,693 | 8/1978 | Oliver | 126/121 |
| 4,109,707 | 8/1978 | Wilson et al. | 165/170 |
| 4,112,914 | 9/1978 | Brown | 126/121 |
| 4,112,915 | 9/1978 | Slavik | 126/121 |
| 4,114,590 | 9/1978 | Frahm | 126/121 |
| 4,120,281 | 10/1978 | Wass | 126/121 |
| 4,122,825 | 10/1978 | Slate | 126/121 |
| 4,129,113 | 12/1978 | Bergstrom | 126/121 |
| 4,149,517 | 4/1979 | Horwinski | 126/121 |
| 4,154,214 | 5/1979 | Owens | 126/121 |
| 4,159,802 | 7/1979 | Ficker et al. | 126/121 |
| 4,170,218 | 10/1979 | Hartley | 126/121 |
| 4,174,701 | 11/1979 | Gneiting | 126/121 |

FOREIGN PATENT DOCUMENTS

| | | | |
|---|---|---|---|
| 622417 | 5/1949 | United Kingdom | 126/121 |
| 749073 | 5/1956 | United Kingdom | 126/121 |

*Primary Examiner*—Daniel J. O'Connor
*Attorney, Agent, or Firm*—Schroeder, Siegfried, Ryan, Vidas, Steffey & Arrett

[57] ABSTRACT

A fireplace grate comprising a support for holding burning logs and the accompanying hot embers and ashes and including heat transfer structure for transferring heat generated by the logs and embers to the area immediately therebelow. The grate further includes air passageways located in the area below the support. The passageways having air outlets at the front of the grate for directing air into the room in which the fireplace is located and air inlets disposed at location remote from the air outlets for receiving air for passage through the passageways.

33 Claims, 4 Drawing Figures

FIREPLACE GRATE

Matter enclosed in heavy brackets [ ] appears in the original patent but forms no part of this reissue specification; matter printed in italics indicates the additions made by reissue.

BACKGROUND OF THE INVENTION

It is common knowledge that household fireplaces are generally inefficient as far as room heating is concerned. Most of the heat goes up the chimney rather than into the room. The heat generated in the conventional fireplace which does enter the room enters only by radiation. This heat is quite intense immediately in front of the fireplace; however, the air a few feet from the fireplace is hardly warmed. As a matter of fact, the use of a fireplace requires air being drawn into the fireplace to support the fire of the burning logs. At least a part of this fire supporting air is most often drawn into the fireplace through cracks existing around doors and windows in the room where the fireplace is located. This tends to produce an overall cooling of the room rather than a warming. Generally, therefore, fireplaces as found in private dwellings are used more for their aesthetic appearance than their heating ability.

Attempts have been made in the past to increase the efficiency of private dwelling fireplaces. In newly constructed homes, siphoned-cooled, prefabricated, self-contained units can be installed. These units are multi-walled with ducting for drawing cold air down the internal side walls of the chimney through the fire and out the chimney as flue air. Still, radiation is relied upon for room heating. With fireplaces of the more conventional type, fireplace grates with means for forcing air through the heated area of the fireplace have been used to increase heating efficiency. Such grates are also sometimes used in prefabricated fireplaces to further increase their heating efficiency.

In construction, fireplace grates with air flow structures typically include hollow ducting through which forced air is circulated and directed into the room in which the fireplace is located. The forced air circulated through the ducting is warmed by the heat of the fire and thus warm air is blown into the room. Grate constructions of this type have, however, certain disadvantages. Most of them are rather bulky in construction and aesthetically unpleasing in looks. In addition, and more importantly, the efficiency of these forced air grates is generally poor.

The internal ducting through which the air is forced for warming is located either above the burning logs or below the logs at a location where embers and ashes from the logs are collected. With the first arrangement, the air is blown into the room at a level which is a few feet off the floor. It will be apparent that this is not the best situation since the most efficient heating of the room will occur where the heat is blown in at or near floor level. In a room with people sitting on chairs and couches, and perhaps on the floor, warm air entering the room from the fireplace at a level of even 2 feet above the floor will not produce the best warming effect for the people.

In the other type of grate construction where the air ducting is located below the logs, such ducting is most usually provided by making the log supporting grate bars hollow. This type of structure is inefficient in a number of respects. First of all, embers and ashes from the burning logs fall through the grate bars and collect on the floor below. The covering of the embers by the falling ashes provides a barrier against efficient heat transfer from the embers to the air passing through the hollow grate bars. Also, with this type of construction, the burning embers which fall from the logs tend to become cooled by the air being blown through the hollow grate bars and thus do not burn completely. Furthermore, since these embers are scattered in the ashes below the hollow bars while the burning logs are disposed above the grate bars, the air circulating through the bars acts as a thermal barrier preventing the heat of the embers from supporting the combustion of the fire of the burning logs. Taking away this support heat for the burning logs, tends to put the fire out prematurely.

SUMMARY OF THE INVENTION

In accordance with the teachings of the present invention, the disadvantages of the prior art types of grate structures are avoided. Warming heat from a burning fire is efficiently pumped into the room at floor level without excessive cooling of the fire and without requiring a roaring fire to supply the desired heat. Generally, applicant's fireplace grate comprises a support for supporting both the logs and the ashes and burning embers at a level above the floor of the fireplace. This support includes heat transfer structure disposed below the logs, ashes and burning embers for transferring heat from the fire to the area immediately below the ashes and burning embers. In this area, air passageways are located for circulating air in heat transfer relationship with the heat transfer structure.

The air passageways include outlets at the front of the grate through which the circulating air exits into the room and air inlets disposed at a location remote from the air outlets and through which air is received for circulation through the passageways. Air flow through the passageways is, with the preferred embodiment, a forced circulation; and for this purpose, a fan is provided. The fan is either located at the fireplace directly below the air passageways or at a remote location, in which case ducting may be provided for directing the air into the air passageways.

The construction and location of the heat transfer structure, the positioning of the logs on the support and the rate at which air is forced through the passageways are all correlated to each other so that the hot embers are insulated sufficiently from the air circulation to permit complete burning of the embers as well as the logs. At the same time, the embers remain in heat transfer relation to the heat transfer structure so as to aid in heating the circulating air. In addition, the air flow is at a rate whereby the area below the heat transfer structure and air passageways is itself insulated from the high temperature of the fire in the fireplace. This permits location of the fan in this area without danger to it being overheated.

As a further feature of applicant's invention, the air inlet for the passageways through the heat transfer structure is disposed in communication with a walled base of the grate. In one embodiment, this base has a bottom opening for positioning over the conventional ash trap door of the fireplace and through which air can be drawn from a source outside of the room in which the fireplace is located. In most houses, the standard type of fireplace and often the prefabricated type, is connected to an ash trap or chamber in the wall structure of the house. Ashes generated by the fire are collected here for later disposal. In a typical installation, the ash trap is located in the basement of the house and suitable internal wall ducting provided for connecting the trap to the fireplace. A removable trap door in the floor of the fireplace communicating with this internal ducting permits disposal of ashes collected in the fireplace. At a suitable, more convenient time, the ash trap itself may be emptied of all ashes.

With the air used for heat exchange purposes being drawn through the ash trap as a separate flow from the normal flow of room air into the fireplace for supporting the burning fire, heating efficiency is increased. More particularly, a net positive air flow out of the fireplace grate and into the room can be created to assure adequate heating of the room.

In addition to the above mentioned features, applicant's grate construction provides further advantages which will become apparent from the following description of the preferred embodiment of the invention.

DETAILED DESCRIPTION OF THE PREFERRED EMBODIMENT

Figure 1:
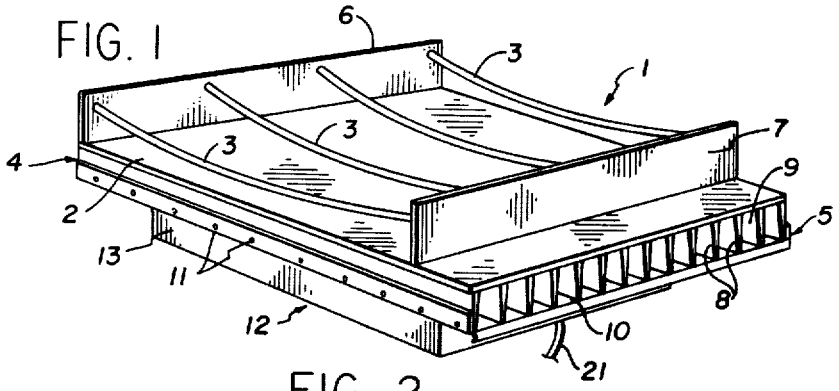
FIG. 1 is a perspective view of the fireplace grate of the present invention.
Figure 2:
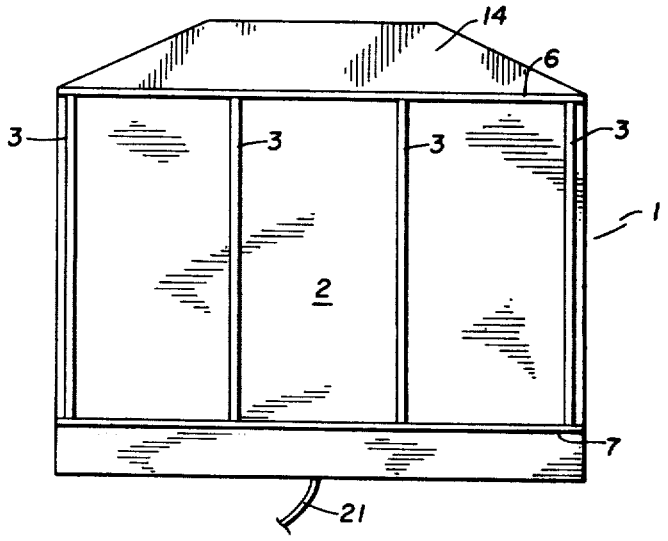
FIG. 2 is a top plan view of the grate shown in FIG. 1.

The fireplace grate 1 includes a support plate 2 for supporting burning logs and the accompanying hot embers and ashes. The logs themselves are positioned on spaced log support rods 3 extending from the back 4 of the grate to the front 5. The rods are mounted at a spaced distance above the support plate by means of rear and front vertical barrier plates 6 and 7. The rear barrier plate 6 is disposed at the back 4 of the grate in line with the rear edge of the support plate 2. The housing structure behind the rear edge of the plate 2 is part of the air circulation ducting and will be described in more detail later. The barrier plate 7 is disposed at the front 5 of the grate but inwardly of the front edge of the support plate 2. In addition to providing a mounting for the rods 3, the barrier plates 6 and 7 assist in containing ashes on the support plate 2.

Figure 4:
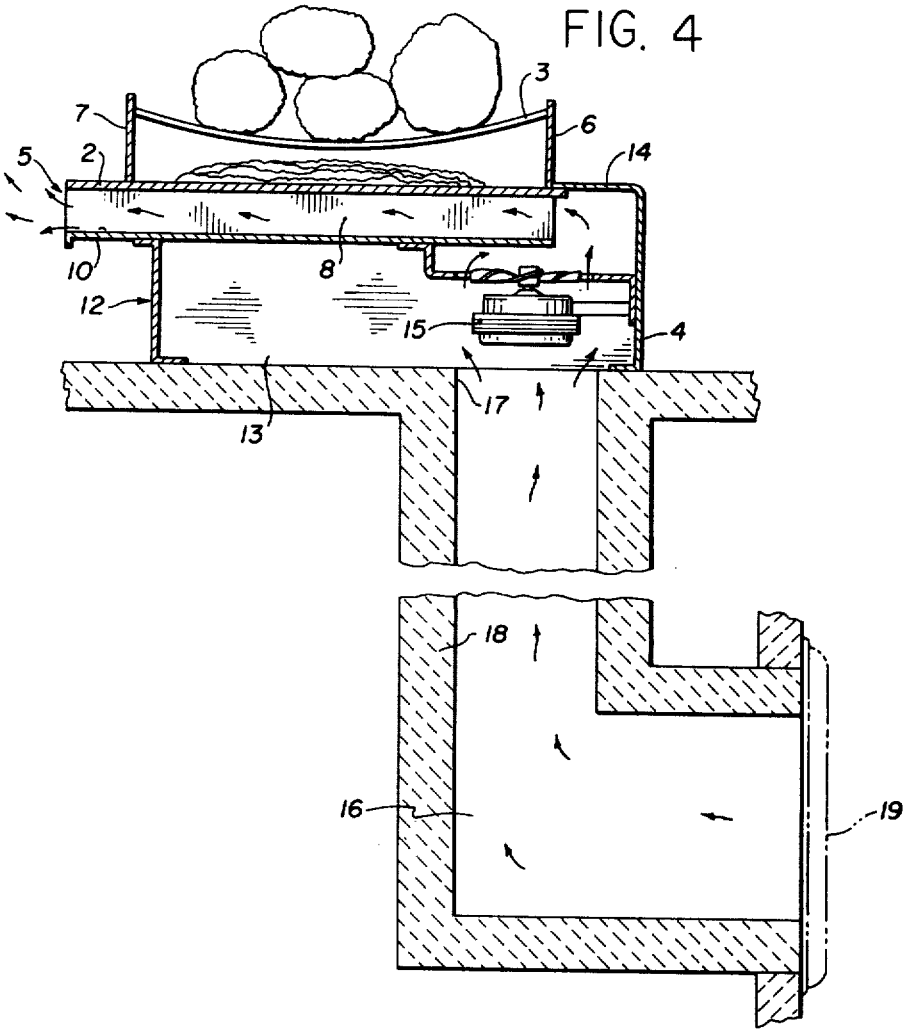
FIG. 4 is a cross-sectional view taken along lines 4—4 of FIG. 3.

Integrally formed as part of the support plate 2 are a plurality of spaced heat transfer fins 8. These fins depend from the support plate; and as shown in FIG. 4, extend the full depth thereof. In the preferred embodiment, the support plate and fins are made from extruded aluminum and together define the heat transfer structure for transferring heat generated by the fire into the area immediately below the support plate 2. The heat transfer fins 8 define an air passageway means for directing air through this area in heat exchange relationship with the plate 2 and fins 8. The individual fins divide the air passageway means into a plurality of air subpassageways 9. The inlets of these subpassageways is at the back of the grate while the outlets are at the front. Both inlets and outlets are located across the entire lateral extent of the support plate 2.

A piece of sheet metal 10 extends across the bottom of the heat transfer fins in a manner generally coextensive with the support plate 2. In this way, the air subpassageways 9 are bounded on the top by the support plate 2 and on the bottom by plate 10. The sheet metal plate 10 may be secured to the heat transfer fins by bending over the side edges of the plate and screwing or otherwise connecting them to the outermost side fins. FIG. 1 shows the plate 10 attached to the side fins by screws 11. The front of the plate 10 is bent downwardly into a curved shape to provide rigidity to the plate and to assist in preventing it from vibrating against the transfer fins.

Figure 3:
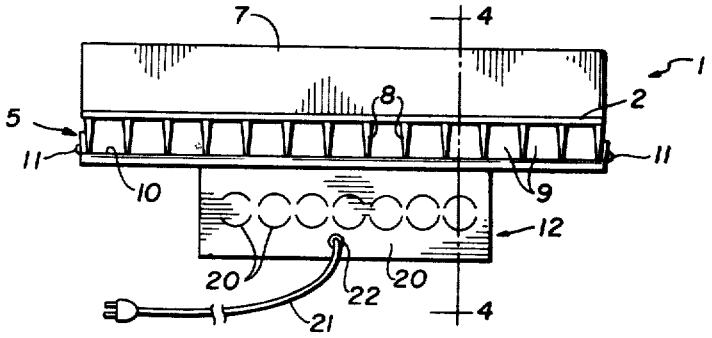
FIG. 3 is a front view of the grate shown in FIG. 2.

A pedestal type base means 12 is provided for supporting the log carrying and heat transfer structure of the grate at a location spaced above the fireplace floor. This base means comprises a walled enclosure 13 depending from the plate 10. The walled enclosure 13 is recessed behind the edge of the support plate 2 and, as shown in FIG. 3, is also spaced inwardly from the sides of the support plate.

At the back 4 of the grate, behind the rear edge of the support plate 2, the walled enclosure extends upwardly to the level of the plate 2 to communicate with the air subpassageways 9. At this location, the walled enclosure thus defines a manifold 14 for connecting the walled enclosure to the inlets of the subpassageways 9.

As shown in FIG. 4, a fan 15 is disposed within the walled enclosure at the back thereof adjacent the manifold 14. This fan forces air through the manifold and into the inlets of the subpassageways 9 at the back of the grate. The air is forced to pass through the subpassageways and exit through the outlets at the front of the grate.

In one arrangement of the grate of the present invention, it will be placed in the fireplace over an open ash trap 16. As shown in FIG. 4, this ash trap 16 is connected to an opening 17 in the floor of the fireplace by suitable ducting 18. In the typical situation with the fireplace on the ground floor, the ash trap will be located in the basement; and as also shown in FIG. 4, a door 19 is provided in the basement adjacent the collection point of the ash trap for permitting removal of ashes. In acordance with the teachings of the present invention, the door 19 of the ash trap will be left open to therefore provide a source of air leading to the interior of the fireplace from a room remote from the room in which the fireplace is located.

With the above construction and arrangement of the grate in the fireplace, air from the basement will be blown through the heat transfer structure of the grate and warmed by the heat of the fire in the fireplace. With this air being drawn from a location remote from the room in which the fireplace is located, the heating effect of the fire is improved. Normally, air from the room in which the fireplace is located is drawn into the fireplace to support combustion of the fire of the burning logs. This fire supporting air usually enters the room through cracks around doors and windows and has a general cooling effect on the overall room. With the present invention, a positive net air flow can be created due to the fact that air from outside of the room in which the fireplace is located can be forced through the fireplace grate at a rate greater than the rate of the air flow into the fireplace from the room. The heating efficiency of the fire beyond the immediate area in front of the fireplace is therefore improved considerably.

Although air from a separate source is shown in FIG. 4, as received through the ash trap structure of the dwelling, it is also possible to provide separate ducting for this purpose. This may be necessary where the fireplace is not provided with an ash trap. Also, as shown in FIG. 3, the front of the walled enclosure 13 of the grate is provided with knocked-out holes 20 which can be used for supplying the air to the walled enclosure and to the heat transfer structure of the grate. In this situation, however, the air will be drawn from the same room in which the fireplace is located and will not produce the net positive air flow out of the fireplace as described above. Nevertheless, the room heating efficiency of the fire will be improved due to generally better burning of the fire and good heat transfer to the air being blown into the room as will be more fully apparent from the following description.

With the construction of applicant's grate, the burning embers falling from the logs disposed on the rods 3 will be caught by the support plate 2. The spacing of the logs above the support plate is small. The rods 3 are of curve construction and supported above the support plate by a distance ranging from about 2½ inches at the barrier plates 6 and 7 to 1½ inches centrally between these barrier plates. The rods themselves are spaced laterally from each other by about 7 inches while the barrier plates are spaced by about 14 inches. The support plate itself has a smooth upper surface and a lateral extent about equal to the normal length of logs to be used in the fireplace. More particularly, the plate has a width of about 22 inches. With this construction, the burning logs are supported immediately above the support plate 2 with the latter receiving even large embers.

The close proximity of the embers to the logs assists greatly in supporting the burning of the logs. Also, the burning of the logs so close to the embers assists in assuring that they are completely used and do not go out prematurely.

The smooth top surface of the support plate with the widely spaced log support rods facilitates easy removal of accumulated ashes onto the fireplace floor. Usually, the fireplace will be larger in width to permit this side removal of ashes. The formation of the base 12 as a pedestal type of walled enclosure will give added room for the collection of ashes. The walled construction of the base also isolates uncollected ashes on the fireplace floor from becoming entrained in the air flow created by the fan disposed within the walled enclosure.

The purpose of the front barrier 7 is multifold. Besides providing a support for the rods 3 and containing ashes on the support plate 2, the front barrier plate 7 prevents ashes and smoke from becoming entrained in the heated air blowing into the room from the heat exchange subpassageways 9. In the normal burning of logs on the grate shown in the drawings, the fire supporting air enters the fireplace and is drawn under the logs from the side of the grate. By disposing the barrier plate 7 at a location spaced from the front edge of the support plate and by having a proper height, the outlets of the subpassageways 9 become effectively isolated from the burning fire, ashes and embers. In the preferred embodiment, the front barrier plate, as well as the rear barrier plate, is about 3 inches in height and the front plate is spaced from the front edge of the support plate by about 2 inches.

The construction of the support plate 2 and heat transfer fins also assists in improving the efficiency of the burning fire. In the preferred embodiment of the grate, the support plate and fins, as already indicated, are made as an integral structure from extruded aluminum. The support plate is formed with a thickness of about ⅛ of an inch; and physically isolates the air passing through the subpassageways 9 from the burning embers. The fins themselves have a thickness about equal to the thickness of the plate where they are joined to the plate; and taper to a thickness at their lower extremity of about 1/16 of an inch. For efficient heat transfer purposes, these fins extend about 1½ inches below the support plate 2 and are spaced from each other by about ½ inch. In the grate constructios shown in FIG. 1 having the dimensional characteristics as described above, there are 40 closely spaced fins.

With the heat transfer construction as described above, complete burning of the embers falling from the burning logs is possible. All of the burning occurs on one side of the heat transfer air being blown through the subpassageways 9. Unlike prior constructions, the burning logs and falling embers are not separated from each other by any air flow. Furthermore, the rate of air flow through the subpassageways 9 is such as to not overcool the heat transfer fins 8 and support plate 2 to thus cool the embers.

In addition to permitting complete burning of the embers and logs of the fire, the heat transfer structure and the air passing through it thermally isolates the interior of the walled enclosure 13 from the heat of the burning fire. This results due, in part, to the location of the heat transfer structure betwen the fire above and the walled enclosure below. Also, the support plate 2, together with the intergrally formed fins 8 take up the heat from the fire and effectively transfer it to the air passing through the subpassageways. The rate of air passing through the subpassageways 9 is sufficient to take this heated air and blow it out of the fireplace and into the room in which the fireplace is located. In this manner, this heat is prevented from passing to the walled enclosure 13 and its interior which thus becomes thermally insulated from the burning fire.

Due to the thermal insulating feature of the grate of the present invention, it is possible to locate the fan 15 directly within the walled enclosure. The power cord for the fan, which is shown at 21, can be fed through an opening 22 in the front wall of the walled enclosure. In this way, the power cord can be lead out the front of the fireplace with no danger that it become heated or be in the area of any dropping embers.

In the preferred embodiment of the invention, the fan used for supplying a sufficient quantity of air has a blade diameter of about 7 inches with the blades pitched at about 30°. The fan motor has a 0.3 amp, 115 volt electrical rating and a 2 watt output. The power consumption of this fan is minimal. A bigger, high powered fan is not required due to the fact that air is being directed freely through the heat transfer structure. It is not necessary to pressurize the air to effect proper flow. Not only does the fan take a minimum household current, but it is readily adapted to being operated on a 12 volt car battery. This is advantageous in situations where there is a power failure.

Although the fan 15 in the preferred construction of the grate is permanently secured internally to the walled enclosure 13, it is possible to locate the fan at a point remote from the grate. With reference to FIG. 4, the fan can, for example, be located adjacent the open door 19 of the ash pit. Other remote positionings of the fan can also be used. The important criteria is that the fan be so situated that it creates an adequate flow of air through the air subpassageways.

I claim:

1. A fireplace grate for holding logs in a fireplace located in a room of a building and having a back adapted to be disposed along the back of the fireplace and a front adapted to face the front of the fireplace, said grate comprising:

a. support means for supporting burning logs and accompanying ashes and hot embers and for transferring heat to air passageway means disposed therebelow, said support means [having a lateral extent about the same as the length of logs to be supported and] comprising a support plate for supporting said ashes and hot embers;

b. a plurality of spaced heat transfer fins depending from said support plate into said air passageway means, said fins [extending from the back of said grate to the front of said grate to define] *and said support plate being integrally formed from extruded aluminum and defining* separate air subpassageways;

c. air passageway means bounded at the top by said support plate *and* bounded [on] *at* the bottom by a second plate [generally co-extensive with] *vertically spaced from* said support plate, and having air inlet means connected thereto [at the back of said grate] and having air outlet means near the front of said grate [extending across substantially the entire lateral extent of said support means;] *and* d. fan means for forcing air into said air inlet means [,] *and* through said air passageway means and e. base means disposed beneath said air passageway means for supporting said grate in said fireplace with said air passageway means spaced above the floor of said fireplace and out said air outlet means into said room [;].

2. A fireplace grate according to claim 1 wherein:

a. each fin is spaced laterally from the next adjacent fin to define one of said subpassageways therebetween.

3. A fireplace grate according to claim 2 wherein:

a. each fin extends downwardly from the support plate for about 1½ inches and is spaced from the next adjacent fin by about ½ inch.

4. A fireplace grate according to claim 3 wherein [: a.] the grate has a lateral extent of about 2 feet and a depth, as measured from its front to its back, of about 1½ feet [; and b. said base means has a lateral extent of about 1 foot centrally of the grate, a depth, as measured from the back of the grate, of about 1¼ feet, and a height of about 4 inches].

5. A fireplace grate according to claim [4] *1* wherein:

a. the support plate and the heat transfer fins are integrally constructed of extruded aluminum;

b. the support plate has a thickness of about ⅛ inch;

c. the fins are tapered in cross-section with a thickness at the support plate of about ⅛ inch and a thickness at their lower extent of about 1/16 inch; and d. the second plate is constructed of sheet metal.

6. A fireplace grate according to claim 1 [wherein:

a. said] *further comprising* base means [includes] *including* a walled enclosure depending from said second plate with openings in the front wall thereof in communication with the air inlet means at the back of the grate.

7. A fireplace grate according to claim 1 [wherein:

a. said] *further comprising* base means [includes] *including* a walled enclosure depending from said second plate with an open bottom communicating with the air inlet means at the back of the grate and adapted to be located over the open ash trap in the floor of the fireplace and the associated conduit means leading to a source of air outside of said room.

8. A fireplace grate according to claim 7 wherein:

a. said walled enclosure further includes knock-out holes in the front wall thereof to provide openings in communication with the air inlet means at the back of the grate as an alternative to the air source through the open bottom of the enclosure.

9. A fireplace grate according to claim 8 further comprising:

a. an enclosed air manifold at the back of the grate and connected between the interior of said walled enclosure and the separate air subpassageways.

10. A fireplace grate according to claim 9 wherein:

a. said fan means is disposed within said walled enclosure for forcing air from said other room, through said open trap, inlet means, manifold and subpassageways.

11. A fireplace grate according to claim 10 wherein:

a. said fan has a blade diameter of 7 inches and a 30° pitch; and b. the fan motor has a 0.3 amp, 115 volt electrical rating and a 2 watt output.

12. A fireplace grate according to claim 10 wherein:

a. said fan means has a power capacity to force air into said air inlet means and through said air subpassageways at a rate greater than the rate of the fire supporting air flow into said fireplace from the room in which the fireplace is located to create a net positive air flow out of the air outlet means of the grate and into said room.

13. A fireplace grate according to claim 1 wherein:

a. said support means includes spaced support rods disposed above the support plate and extending from the back of the grate to the front for supporting logs thereon at a position spaced above said support plate.

14. A fireplace grate according to claim 13 wherein:

a. the support rods are spaced above the support plate by between about 1½ and 2½ inches.

15. A fireplace grate according to claim 13, wherein:

a. said fan means has a flow capacity for forcing air from said air inlet means and through said air subpassageways at a rate which permits complete burning of the hot embers falling from the burning logs onto the support plate and which insulates the [internal area of the base means from the high heat of the fire of the burning logs] *area beyond said second plate.*

16. A fireplace grate according to claim 13 wherein:

a. the support plate has an upper smooth surface on which the burning embers and ashes collect.

17. A fireplace grate according to claim 16 further comprising:

a. a front vertical barrier plate extending laterally across the support plate adjacent the front thereof for containing ashes on the support plate.

18. A fireplace grate according to claim 17 wherein:

a. said barrier plate is about 3 inches in height and located about 2 inches from the front of the grate.

19. A fireplace grate according to claim 18 further comprising:

a. rear vertical barrier plate extending laterally across the support plate at the rear thereof for containing ashes on the support plate.

20. A fireplace grate according to claim 19 wherein:

a. said spaced rods extend between said vertical barrier plates with the ends of the rods connected to the plates.

21. A fireplace grate according to claim 20 wherein:

a. the support rods are spaced above the support plate midway between the barrier plates by about 1½ inches and at the barrier plates by about 2½ inches.

*22. A fireplace grate for holding logs in a fireplace located in a room of a building and having a back adapted to be disposed along the back of the fireplace and a front adapted to face the front of the fireplace, said grate comprising:*

*a. support means for supporting burning logs and accompanying ashes and hot embers and for transferring heat to air passageway means disposed therebelow, said support means comprising a support plate for supporting said ashes and hot embers;*

*b. a plurality of spaced heat transfer fins depending from said support plate into said air passageway means, said fins and said support plate being integrally formed from extruded aluminum and defining separate air subpassageways;*

*c. air passageway means bounded at the top by said support plate and bounded at the bottom by a second plate vertically spaced from said support plate, and having air inlet means connected thereto at the back of said grate and having air outlet means near the front of said grate;*

*d. fan means for forcing air into said air inlet means, through said air passageway means and out said air outlet means into said room; and*

*e. said fan means being constructed and arranged to force air between said fins and said plates at a rate sufficient to preclude overheating the area beyond said second plate and said fins.*

*23. A fireplace grate for holding logs in a fireplace located in a room of a building and having a back adapted to be disposed along the back of the fireplace and a front adapted to face the front of the fireplace, said grate comprising:*

*a. support means for supporting burning logs and accompanying ashes and hot embers and for transferring heat to air passageway means disposed therebelow, said support means comprising a support plate for supporting said ashes and hot embers;*

*b. a plurality of spaced heat transfer fins depending from said support plate into said air passageway means, said fins and said support plate being integrally formed from extruded aluminum and defining separate air subpassageways;*

*c. air passageway means bounded at the top by said support plate and bounded at the bottom by a second plate vertically spaced from said support plate, and having air inlet means connected thereto at the back of said grate and having air outlet means near the front of said grate;*

*d. fan means for forcing air into said air inlet means, through said air passageway means and out said air outlet means into said room; and*

*e. said fan means being constructed and arranged to move air between said fins and said plates at such a rate as to not overcool or overheat said fins and said support plate.*

*24. A fireplace grate for holding logs in a fireplace located in a room of a building and having a back adapted to be disposed along the back of the fireplace and a front adapted to face the front of the fireplace, said grate comprising:*

*a. support means for supporting burning logs and accompanying ashes and hot embers and for transferring heat to air passageway means disposed therebelow, said support means comprising a support plate for supporting said ashes and hot embers;*

*b. a plurality of spaced heat transfer fins depending from said support plate into said air passageway means, said fins and said support plate being integrally formed from extruded aluminum and defining separate air subpassageways;*

*c. air passageway means bounded at the top by said support plate and bounded at the bottom by a second plate vertically spaced from said support plate, and having air inlet means connected thereto at the back of said grate and having air outlet means near the front of said grate;*

*d. air circulating means for moving air into said air inlet means, through said air passageway means and out said air outlet means into said room; and*

*e. said air-circulating means being constructed and arranged to move air between said fins and said plates at a rate sufficient to preclude overheating the area beyond said second plate and said fins.*

*25. A fireplace grate for holding logs in a fireplace located in a room of a building and having a back adapted to be disposed along the back of the fireplace and a front adapted to face the front of the fireplace, said grate comprising:*

*a. support means for supporting burning logs and accompanying ashes and hot embers and for transferring heat to air passageway means disposed therebelow, said support means comprising a support plate for supporting said ashes and hot embers;*

*b. a plurality of spaced heat transfer fins depending from said support plate into said air passageway means, said fins and said support plate being integrally formed from extruded aluminum and defining separate air subpassageways;*

*c. air passageway means bounded at the top by said support plate, bounded on the bottom by a second plate vertically spaced from said support plate, and having air inlet means connected thereto at the back of said grate and having air outlet means near the front of said grate;*

*d. fan means for forcing air into said air inlet means, through said air passageway means and out said air outlet means into said room; and*

*e. said fan means being constructed and arranged to force air between said fins and said plates in sufficient volume and at sufficient velocity to preclude overheating the area beyond said second plate and said fins and to prevent the sagging of said fins and of said support plate from the heat of the burning logs and hot embers supported thereby.*

*26. In a fireplace grate of the type which supports logs in a fireplace located in a room of a building and having a back adapted to be disposed along the back of the fireplace and a front adapted to face the front of the fireplace, the improvement which comprises:*

*a. a support plate including a plurality of spaced heat transfer fins depending from said support plate into air passageway means disposed below said support plate, said fins and said support plate being integrally*

*formed from extruded aluminum and extending from the back of said grate to the front of said grate to define separate air subpassageways;*

*b. air passageway means bounded at the top by said support plate, bounded on the bottom by a second plate, and having air inlet means connected thereto at the back of said grate and having air outlet means near the front of said grate; and*

*c. fan means for forcing air into said air inlet means, through said air passageway means and out said air outlet means into said room at sufficient rate to preclude overheating the area beyond said support plate and depending fins.*

*27. In a fireplace grate of the type which supports logs in a fireplace located in a room of a building and having a back adapted to be disposed along the back of the fireplace and a front adapted to face the front of the fireplace, the improvement which comprises:*

*a. a support plate including a plurality of spaced heat transfer fins depending from said support plate into air passageway means disposed below said support plate, said fins and said support plate being integrally formed from extruded aluminum and extending from the back of said grate to the front of said grate to define separate air subpassageways;*

*b. air passageway means bounded at the top by said support plate, bounded on the bottom by a second plate, and having air inlet means connected thereto at the back of said grate and having air outlet means near the front of said grate; and*

*c. fan means for forcing air into said air inlet means, through said air passageway means and out said air outlet means into said room, said fan means being constructed and arranged to force air between said fins and said plates in sufficient volume and at sufficient velocity to preclude overheating the area beyond said second plate and said fins and to prevent the sagging of said fins and of said support plate from the heat of the burning logs and hot embers supported thereby.*

*28. A system for increasing the heating efficiency of a fireplace fire which comprises:*

*a. air passageway means having air inlet and outlet means and being bounded by spaced first and second plate means, said first plate means defining a heat transfer structure and being formed of extruded aluminum having a plurality of closely spaced fin means integrally formed therewith and extending toward said second plate means to divide said air passageway means into a plurality of separate air subpassageways, said heat transfer structure being positioned intermediate said fire and said second plate; and*

*b. means for forcing an air circulation between said air passageway means inlet and outlet means at sufficient rate to preclude overheating of the area beyond said heat transfer structure.*

*29. A system for increasing the heating efficiency of a fireplace fire which comprises:*

*a. heat transfer structure defining air passageway means having air inlet and outlet means and being formed of extruded aluminum;*

*b. said heat transfer structure being comprised of first plate means and a plurality of extruded closely spaced fin means integrally formed therewith and extending outwardly from one side thereof from a point adjacent said air inlet means to a point adjacent said air outlet means;*

*c. second plate means spaced from said first plate means and cooperatively defining an air passageway with said first plate means, some of said fin means being disposed within said air passageway and defining a plurality of air subpassageways between said first and second plate means;*

*d. said heat transfer structure being constructed and arranged to be positioned adjacent the fire and intermediate the fire and said second plate means; and*

*e. means for circulating air into said air inlet means through said air subpassageways and out of said air outlet means at a rate sufficient to preclude overheating said heat transfer structure and the area beyond said second plate means.*

*30. The system of claim 29 wherein said fin means extend from said first plate means about 1½ inches toward said second plate means and are spaced from the next adjacent fin means by about ½ inch.*

*31. The system of claim 29 wherein first plate means has a thickness of about ⅛ inch with said fin means being tapered in cross-section from a thickness of about ⅛ inch adjacent the first plate to a thickness of about 1/16 inch.*

*32. The system of claim 29 wherein said second plate means is formed of sheet metal.*

*33. A system for increasing the heating efficiency of a fireplace fire which comprises:*

*a. heat transfer structure formed of extruded aluminum;*

*b. said heat transfer structure being comprised of plate means and a plurality of extruded closely spaced fin means integrally formed therewith of extruded aluminum and extending outwardly from one side thereof;*

*c. second plate means spaced from said first plate means and cooperatively defining therewith an air passageway therebetween, said air passageway having air inlet and outlet means;*

*d. said fin means extending between said first and second plate means within said air passageway from said air inlet means to said air outlet means and defining a plurality of air subpassageways with said first and second plate means;*

*e. said heat transfer structure being constructed and arranged to be positioned adjacent the fire and intermediate the fire and said second plate means; and*

*f. means for circulating air into said air inlet means, through said air subpassageways and out said air outlet means at a rate sufficient to preclude overheating said heat transfer structure and the area beyond said second plate means.*

* * * * *

UNITED STATES PATENT AND TRADEMARK OFFICE

CERTIFICATE OF CORRECTION

PATENT NO. : RE 30,725

DATED : September 1, 1981

INVENTOR(S) : John G. Meeker

It is certified that error appears in the above-identified patent and that said Letters Patent are hereby corrected as shown below:

Column 7, line 29, after "and" second occurrence, insert --out said air outlet means into said room. [; and--.

Column 7, line 33-34, delete "and out said air outlet means into said room".

Column 7, line 34, delete "[;]" and insert therefor --]--.

Signed and Sealed this

*Twenty-second* Day of *December 1981*

[SEAL]

*Attest:*

GERALD J. MOSSINGHOFF

*Attesting Officer*

*Commissioner of Patents and Trademarks*